J. F. SKIRROW & J. T. NEEDHAM.
TRANSFER TUBE SYSTEM.
APPLICATION FILED MAY 23, 1905. RENEWED FEB. 15, 1910.

976,753.

Patented Nov. 22, 1910.

J. F. SKIRROW & J. T. NEEDHAM.
TRANSFER TUBE SYSTEM.
APPLICATION FILED MAY 23, 1905. RENEWED FEB. 15, 1910.

976,753.

Patented Nov. 22, 1910.

J. F. SKIRROW & J. T. NEEDHAM.
TRANSFER TUBE SYSTEM.
APPLICATION FILED MAY 23, 1905. RENEWED FEB. 15, 1910.

976,753.

Patented Nov. 22, 1910.
5 SHEETS—SHEET 4.

J. F. SKIRROW & J. T. NEEDHAM.
TRANSFER TUBE SYSTEM.
APPLICATION FILED MAY 23, 1905. RENEWED FEB. 15, 1910.

976,753.

Patented Nov. 22, 1910.
5 SHEETS—SHEET 5.

Witnesses
Inventors
John F. Skirrow
John T. Needham
By their Attorneys Davis & Davis

UNITED STATES PATENT OFFICE.

JOHN F. SKIRROW, OF EAST ORANGE, NEW JERSEY, AND JOHN T. NEEDHAM, OF NEW YORK, N. Y., ASSIGNORS, BY MESNE ASSIGNMENTS, TO INTER STATE TUBE COMPANY, A CORPORATION OF NEW YORK.

TRANSFER-TUBE SYSTEM.

976,753.　　　Specification of Letters Patent.　　Patented Nov. 22, 1910.

Application filed May 23, 1905, Serial No. 261,913. Renewed February 15, 1910. Serial No. 544,077.

*To all whom it may concern:*

Be it known that we, JOHN F. SKIRROW, a citizen of the United States, residing at East Orange, in the county of Essex, State of New Jersey, and JOHN T. NEEDHAM, a subject of the King of Great Britain, residing in the borough of Brooklyn, county of Kings, city and State of New York, have invented certain new and useful Improvements in Transfer-Tube Systems, of which the following is a specification, reference being had therein to the accompanying drawings in which—

One of the many objects of this invention is to provide an electrically controlled terminal head having a plurality of carrier receiving chambers connected to a single transmission tube, and to so control the covers or closures to said carrier receiving chambers, that when one of said covers is closed the other or others will be released and moved to open position.

A further object of the invention is to provide means whereby the last cover to be closed on a carrier receiving chamber will remain in its closed position for a predetermined time, this time being so determined as to permit the last carrier placed in the head to reach its destination before the cover is open.

A further object of the invention is to provide electric means controlled by the covers of the carrier receiving chambers for completing the electric motor circuit; and further to provide means whereby said electric motor circuit will remain closed for a predetermined time and will be opened by means operated by the motor.

Another object of this invention is to provide a terminal having a receiving member and a delivery member, and to provide means whereby the transmission tube may be connected to the receiving member or the delivery member, so that the terminal may be converted into a receiving or delivery terminal, at will.

Other objects of the invention relating to details of construction and novel arrangements of the parts will be hereinafter fully set forth.

Referring to the various parts by numerals, 1 designates the stand of the terminal head which supports within its upper portion the outer casing 2 of the head. Secured to the top of this casing and to the top of the stand is a cover-plate 3, said cover-plate closing the head. Secured rigidly to the cover-plate, side by side, are two depending cylindrical tubes which are open at their ends and form carrier-receiving chambers 4, the lower ends of said tubes extending slightly below the bottom of the head. These tubes are perforated for the greater portion of their length and near their upper ends, so that the interiors of said tubes are in communication with the interior of the casing 2. The lower ends of these tubes open into the upper end of a downwardly converging carrier-receiving chute or discharge member 5 whose lower end is rigidly supported by a cross bar 6 of the stand. The upper end of this carrier receiving member is rigidly secured to the bottom of the head 2. The air supply pipe 7 is in communication with the interior of the head 2, so that air will pass from said head through the perforations in the carrier-receiving tubes and thence down through the receiving chute 5 to the transmission tube.

On the top of the cover-plate just back of the carrier-receiving tubes 4, are mounted pivoted covers 8 in such position that they may be swung down to the cover plate and close the upper ends of the carrier-receiving tubes. Within the head 2 and surrounding each of the carrier receiving tubes is a sleeve-like valve 9 which is perforated as shown clearly in Fig. 1. To maintain these valves in such a position that their porforations will be out of line with the perforations in the tube, springs 10 are arranged below said sleeves as shown clearly in Fig. 1. Formed on each sleeve near its lower end is a rearward extending lug 11, and engaging the upper side of this lug is a lower end of a plunger 12, said plunger extending upward through the cover plate. It will, of course, be understood, that one of these plungers is provided for each valve 9. These plungers are so arranged that their upper ends are adapted to be engaged by the covers as said covers are thrown downward to close the receiving tubes, and they are so proportioned that when the covers are closed the perforations in the valve sleeves are brought into register with the perforations in the receiving tubes. The springs 10 serve to force the covers to their open positions by means of the plungers 12.

Figure 1:
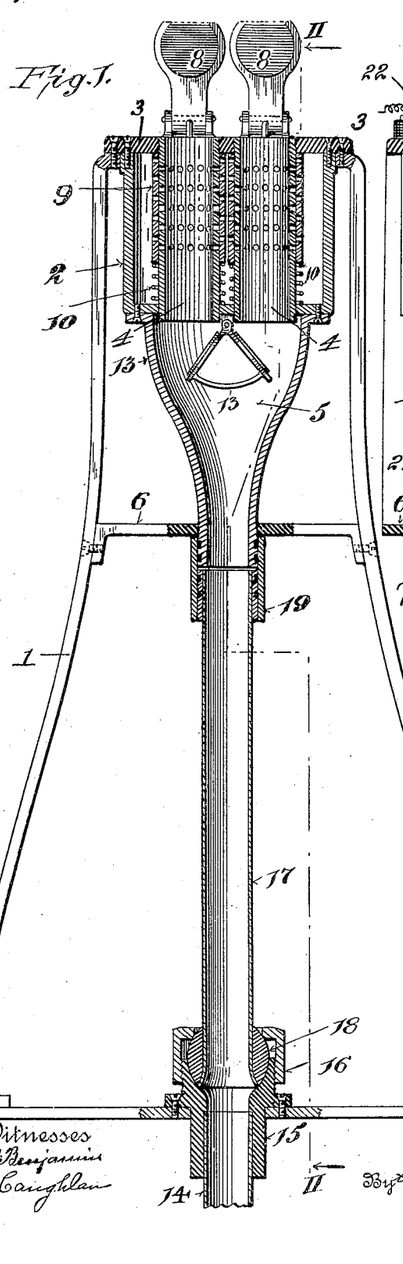
Figure 1 is a vertical sectional view of the terminal.

To prevent air passing upward through one receiving tube when it is passing into the transmission tube from the other receiving-tube, a double swinging-valve 13 is mounted within the member 5 at a point midway between the two receiving-tubes, as shown clearly in Fig. 1. This valve will be engaged by the incoming carrier and thrown on its pivot to close the open receiving tube. The inrushing air will also assist in swinging said valve to close the receiving tube and the pressure of air within the member 5 will hold said valve closed during the passage of the carrier through the transmission tube.

The end of the transmission tube 14 is seated in a casting 15 which forms one member of a clamp 16. Held in position by this clamp is a short section 17 of the transmission tube, said section being provided at its lower end with a ball 18 which fits within the socket formed by the two members of the clamp 16, so that said section 17 of the transmission tube is connected to the permanent section 14 by a ball-and-socket joint. The upper end of the section 17 of the transmission-tube is detachably connected to the lower end of the member 5 by means of a sliding sleeve 19, suitable packing rings being provided between the tube and the sleeve to form an air-tight joint. The tube 17 may be disconnected from the receiving member 5 of the head by sliding down the sleeve 19 to free it from the said member.

Secured to the front of the head 2 is a delivery tube 20 whose lower end is adjacent to the lower end of the chamber 5, and in such angular relation thereto that the upper end of the movable section 17 of the transmission tube may be brought into axial alinement therewith. This permits the sleeve 19 to be engaged with the lower end of said delivery tube. This converts the station into a delivery terminal. Passing through the head is an auxiliary transmission tube 21 whose lower end is arranged adjacent to the lower end of the member 5, and in such angular relation thereto that the movable section 17 of the transmission tube may also be brought into alinement therewith and the sleeve 19 be caused to engage it. By this means the transmission tube may be connected to the auxiliary tube 21 so that carriers will pass by the station either into or from the transmission tube 14, the auxiliary tube carrying them beyond the head 2. By this means one line of transmission tubing may be employed and on that line various stations or heads may be placed, each head being adapted to be converted into a receiving or delivery terminal, at will.

The advantage of providing the head with two receiving tubes or chambers into which carriers may be introduced alternately is very great, as it will enable the operator to rapidly despatch carriers without the loss of air. It will be readily understood that in a compression system the terminal gate at the receiving end of the system must be kept closed in order to prevent the escape of air and that by means of applicant's construction the terminal is practically open at all times during the transmission of carriers there being practically no time during which both covers are closed.

Figure 2:
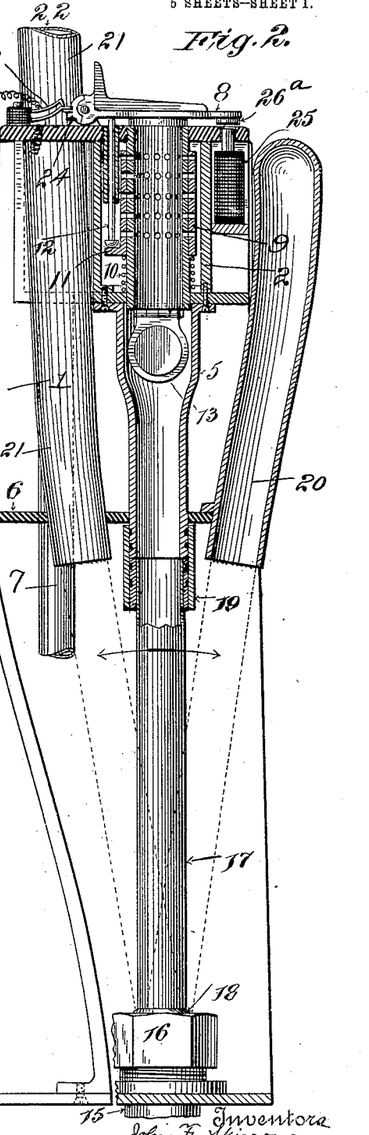
Fig. 2 a vertical sectional view on the line II—II of Fig. 1.
Figure 3:
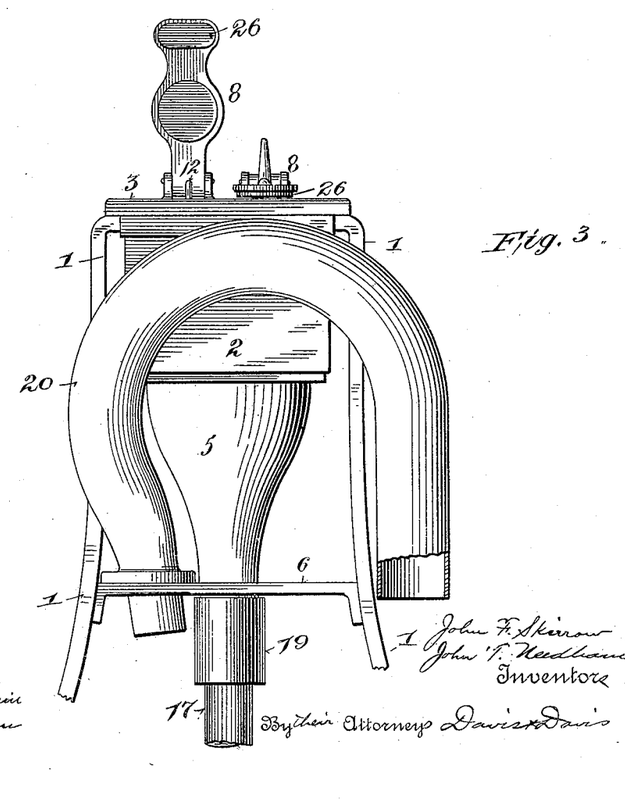
Fig. 3 a front elevation of the terminal.
Figure 4:
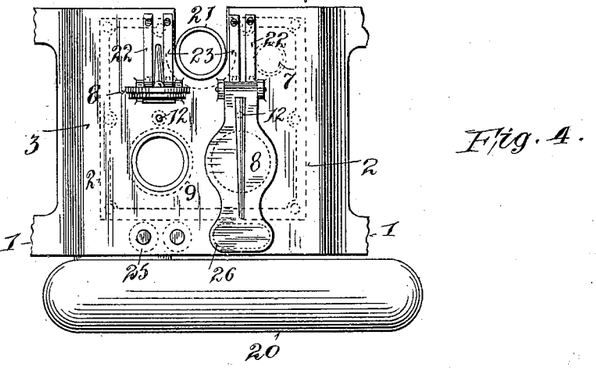
Fig. 4 a plan view.
Figure 5:
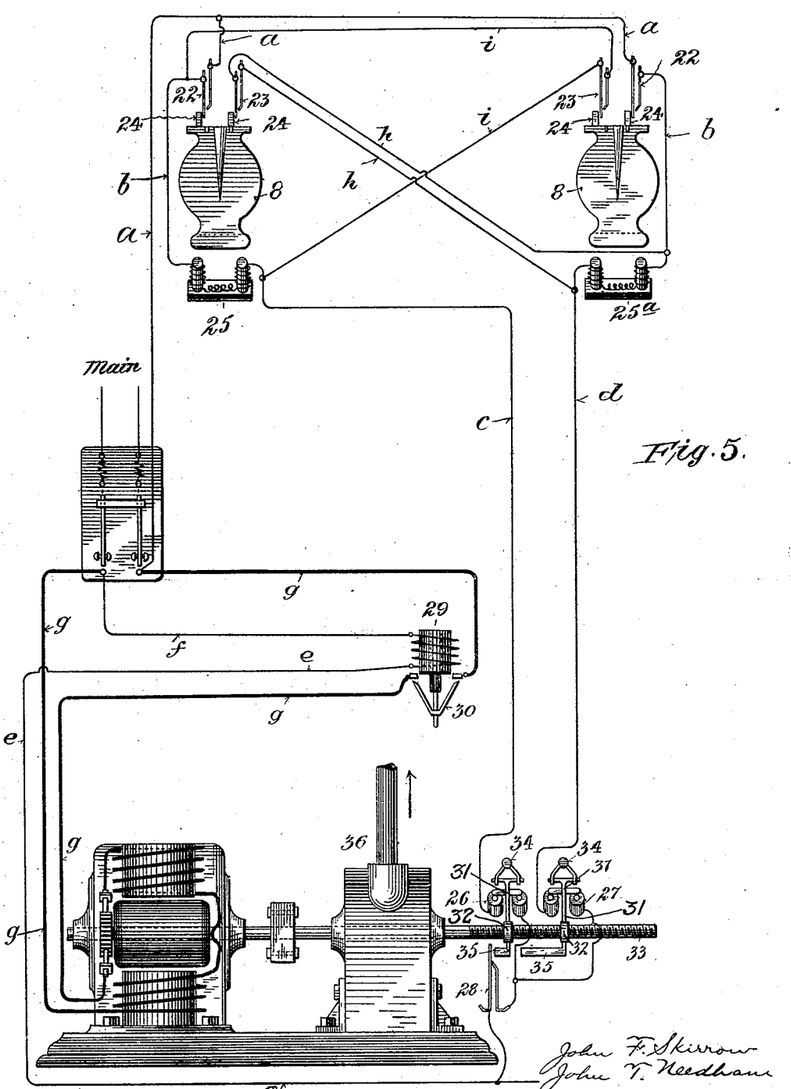
Fig. 5 a diagrammatical view showing the motor controlling circuits.
Figure 6:
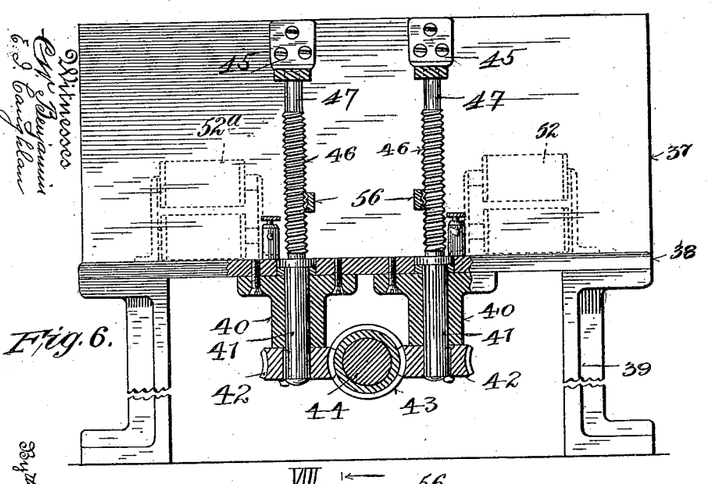
Fig. 6 a vertical sectional view on the line VI—VI of Fig. 7.
Figure 7:
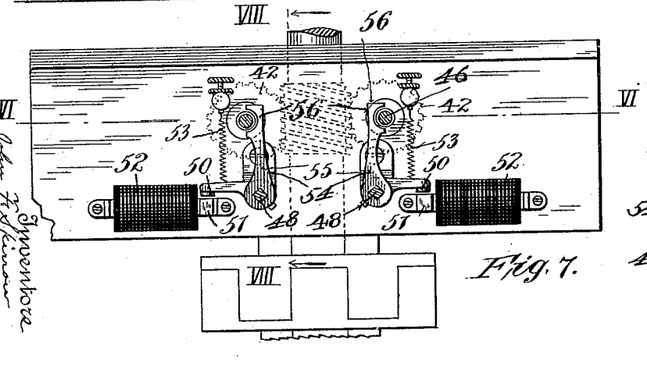
Fig. 7 a detail horizontal sectional view on the line VII—VII of Fig. 8.
Figure 8:
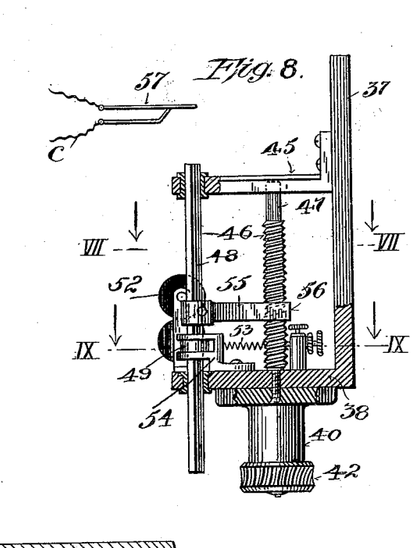
Fig. 8 a vertical sectional view on the line VIII—VIII of Fig. 7.
Figure 9:
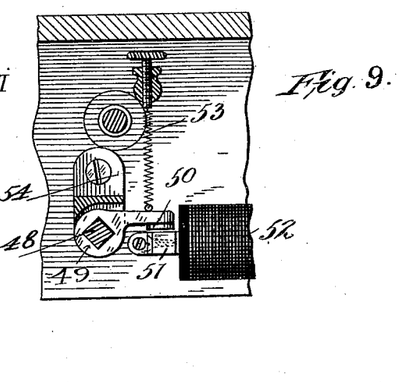
Fig. 9 a detail horizontal view on the line IX—IX of Fig. 8.

The means for electrically controlling the covers of the receiving tubes and the electric time control of the motor will now be described. This apparatus is shown in diagram in Fig. 5 of the drawing. Referring to said figure it will be noted that at the rear of each cover 8 are arranged two pairs of contacts 22 and 23. Each cover plate is provided with two cams 24. One pair of contacts 22 and one cam 24 are shown clearly in Fig. 2 of the drawings. One of the contacts of each pair of contacts 22 is connected to the main line wires through wires $a$. The other contacts of said pairs are connected by wires $b$ to the electro-magnets 25 and 25$^a$, one of said magnets being provided for each cover. One of these magnets is shown clearly in Fig. 2 of the drawing. As there shown the poles of the magnet extend upward through openings in the cover plate 3 of the head and are in a position to strongly attract the armature plate 26$^a$ carried by the adjacent cover 8. From the magnet 25 the circuit is carried by wire $c$ to the electro-magnet 26 of the motor timing devices; and from the magnet 25$^a$ the circuit is carried by means of wire $d$ to the electro-magnet 27 of the motor timing device. This timing device is shown in detail in Figs. 6, 7, 8 and 9, and in diagram in Fig. 5. This part of the apparatus will be first described as shown in Fig. 5 and will then be described in detail with reference to Figs. 6–9 inclusive. As shown in Fig. 5 the magnets 26 and 27 are electrically connected with a pair of normally closed contacts 28, said contacts being connected by wire $e$ to a solenoid 29, and then to the mains by wire $f$. The armature of the solenoid carries a motor circuit closing bar 30, the motor circuit being through wires $g$. Each of the magnets 26 and 27 attracts an arm 31 which is provided with a half nut 32 adapted to be held by the magnet in engagement with the threaded end of the motor shaft. Each of said arms is pivoted at 34 and is provided with an arm 35, adapted to engage one of the contacts 28 to break the motor controlling circuit at that point. Each pair of contacts 23 are connected by wires $h$ and $i$ to the electro-magnets of the opposite cover in such manner that when the members of either of said pairs of contacts are brought together by closing the cover, the electro-magnet holding the other cover closed is shunted and the cover released.

The operation of this portion of the apparatus may be briefly described as follows: When the cover 8 at the left hand side of the diagram shown in Fig. 5 is closed the motor controlling circuit is closed through the contacts 22, wires $a$, $b$, magnet 25, wire $c$, magnet 26, contacts 28, wire $e$, through the solenoid 29, and wire $f$. By this circuit the magnet 25 is energized and the cover 8 held closed; the magnet 26 is energized and the half nut 32 brought into engagement with the screw on motor shaft, and the solenoid 29 is energized. This solenoid completes the motor circuit, and the blower 36 is operated to force air into the head 2 to drive the carrier through the transmission tube. The motor will continue to rotate until the contact arm 35 of the nut 32 engages one of the contacts 28 and breaks the motor controlling circuit at that point. The result of this is that the cover is released and is thrown to its open position by the spring 10 shoving up the valve 9 and the push rod 12; the solenoid will release its arm 30 and thereby break the motor circuit and the magnet 26 will release its arm 31 and permit it to return to its normal position. This arm is provided with means whereby it will automatically return to its normal position when released by this magnet, as will be described in detail with respect to Figs. 6–9 inclusive. It will therefore be seen that by simply closing one of the covers the motor will be started and will be operated for a predetermined time and that at the end of that time the apparatus will be returned to its normal inoperative condition, and all of the apparatus will be at rest with all circuits open.

When the cover shown on the right hand side of Fig. 5 is closed, while the cover at the left hand side of said figure is also closed, the operation of the apparatus will be as follows: The electro-magnet 25 controlling the opposite cover will be shunted through wires $i$ and the cover controlled thereby released. It will also de-magnetize magnet 26 and release its arm 31 permitting it to return to its normal position. The motor controlling circuit will be instantly closed through wires $a$, $b$, magnet $25^a$, wire $d$, magnet 27, contacts 28, wire $e$, solenoid 29, and wire $f$. Magnet 27 will throw its arm 31 into engagement with the motor shaft, and the motor will continue to rotate until its arm 35 engages the contacts 28 and separates them. It will therefore be seen that as soon as the circuit is completed through the magnet $25^a$ the motor will be controlled through magnet 27, magnet 26 being rendered inoperative. As soon as this magnet is inoperative its arm has no further controlling effect over the motor. Of course, should the cover at the left hand side of Fig. 5 be closed while the cover at the right hand side is closed, the operation of the motor controlling circuits and timing device will be the same as heretofore described.

Referring to Figs. 6–9 inclusive, 37 designates a vertical plate supported by a horizontal table 38, this latter being mounted upon suitable legs 39. On the bottom of the table 38 located a suitable distance apart are two vertical bearings 40 in each of which is mounted a vertical shaft 41. On the lower end of each of these shafts is secured a worm-gear 42, both of said gears meshing with a worm 43 secured to the motor shaft 44. The shafts 41 are extended above the table 38, and their upper ends are supported in bearing brackets 45 secured to the vertical plate 37 and extending forward therefrom. These shafts above the table are provided with screw-threaded portions 46, said threads terminating a short distance below the brackets 45 in order to leave an unthreaded portion 47. In front of each shaft 41 is slidably mounted in the table 38 and in the bracket 45, a vertical controller rod 48 which is angular in cross section. Loosely mounted on each of these vertical rods 48 just above the table is an armature carrying arm 49, the armature 50 of which is vertical and lies close to the sides of the poles 51 of the electro-magnet 52. This magnet is mounted upon the table as shown clearly in Figs. 7 and 8. Connected to the armature-arm is a spring 53 which normally holds the armature away from the magnet poles. Each arm 49 is formed with an angular opening therein to receive the bar 48 and through which said bar is adapted to move vertically. To prevent any vertical movement of the armature-arm a forked retaining bracket 54 is provided, said bracket being secured to the table and embracing the arm 49, as shown clearly in Fig. 9. It is clear from the foregoing that when the magnets 52 are energized the armatures 50 are attracted and the arms 49 swung in toward the magnet poles, and the bars 48 correspondingly turned in their bearing.

On each of the bars 48 is rigidly secured a clutch arm 55 whose outer end is provided with a clutch 56 which is adapted to engage a threaded portion 46 of the adjacent vertical shaft 41. The clutch shown in the drawing is in the form of a half nut threaded to correspond with the threads on the shaft 41, but it will be understood that the clutch may be of any suitable form. The springs 53 normally hold the clutches out of engagement with the threaded shafts, said clutches being thrown into engagement with the shaft the instant the electro-magnets are energized. It will be readily seen that when the clutch is in engagement with its threaded shaft 41 the controller bar 48 will be raised, it being of course, understood that the shafts 41 will be rotated in the proper direction to raise the clutches 56. Above the controller bars and in position to be engaged by them when they have been raised a predetermined distance is a pair of contacts 57 which are located in the motor controlling circuit and correspond to the contacts 28 in the diagrammatic view Fig. 6.

The operation of this motor timing mechanism is as follows:—The magnets 52 correspond with the magnets 26 and 27 of the diagrammatic view. When the motor controlling circuit is completed through one magnet 52, the adjacent armature is attracted and the controlling bar 48 connected thereto is slightly rotated and throws its clutch into engagement with the shaft 41. This shaft is rotated by means of the worm 43 on the motor shaft and the worm-gear 42 on the lower end of the shaft 41. The motor controlling circuit will remain closed until the controller bar has been raised sufficiently to engage one of the contacts 57 and thereby open said circuit. As soon as this is accomplished the spring 53 swings the armature and releases the clutch 56 and permits said clutch and the controller bar to drop to their normal position ready for the next operation. The clutch arm 55 is adjustable on the controller bar in order that the distance through which said bar must move before opening the motor controlling circuit, may be varied. By this means the length of time during which the motor is operated may be varied to suit the length of the transmission tube, and to insure the operation of the motor until the carrier has reached its destination. It will, of course, be understood that the wires forming the electric circuits between the terminals of the system and the starting mechanism and timing devices may be arranged in any suitable manner, but we prefer to place these wires in the air supply pipe and by that means avoid the use of a separate wire conduit or pipe. It has been the practice in wiring apparatus of this class to arrange the wires of the various circuits in an additional tube or conduit. It will be seen that by arranging the wires in the air supply pipe the cost of the extra conduit or pipe is avoided without the loss of any efficiency. The wires will be carried into the air chamber of each head through suitable stuffing boxes to prevent any loss of air, and from there will be led into the air supply pipe. At a point near the motor the wires will be led from the air supply pipe through a suitable stuffing box and from thence to the timing devices and the motor controlling means.

Figures 10, 11, 12:
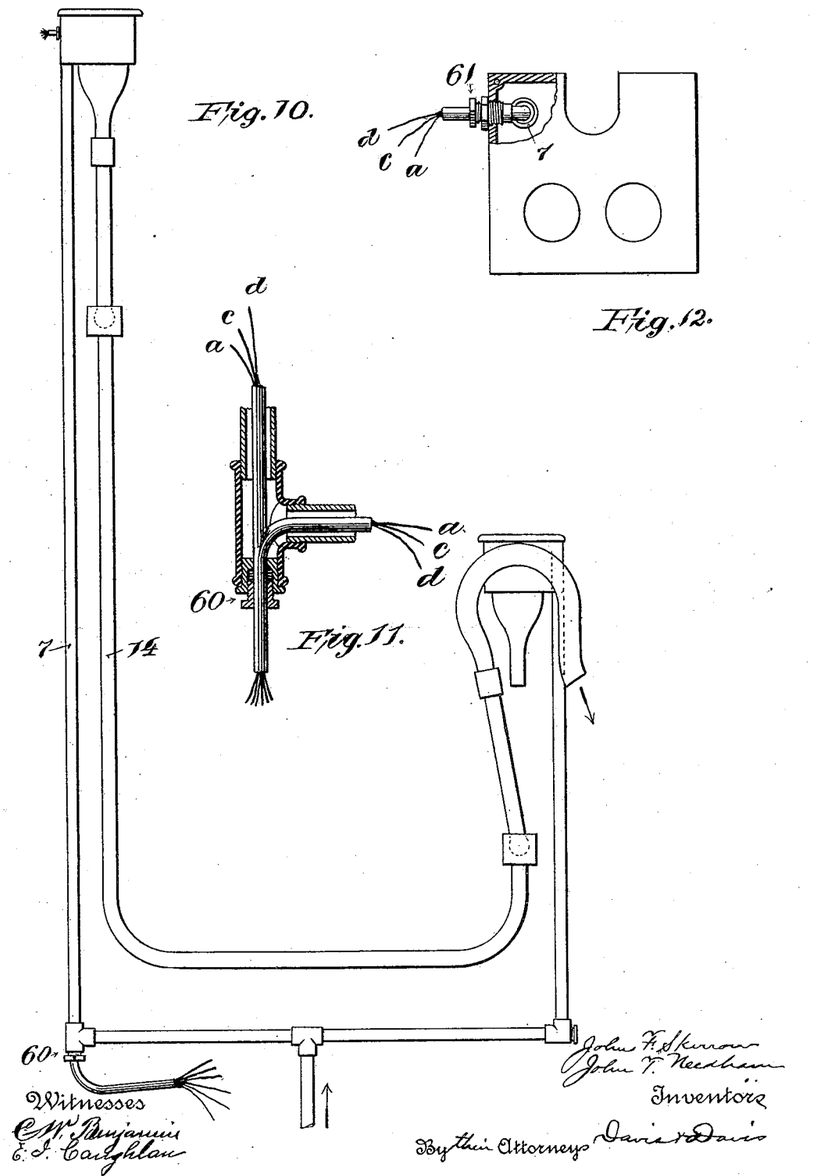
Fig. 10 a diagrammatic view of the apparatus.
Fig. 11 a detail sectional view showing the electric circuit wires within the air supply pipe.
Fig. 12 a detail horizontal sectional view of the head showing means for entering the circuit wires therein.

In Fig. 10, 60 designates the stuffing box through which the wires pass from the air supply pipe 7 to the timing devices and the starting devices. In Fig. 11 this stuffing box is shown in sectional view. In Fig. 12, 61 designates the stuffing box through which the circuit wires pass into the air chamber of the head.

Having thus described our invention what we claim as new and desire to receive by Letters Patent is:—

1. A transfer tube system comprising a terminal having a plurality of carrier receiving chambers, a single transmission tube connected to said chambers and adapted to receive carriers therefrom, covers for the carrier receiving chambers, means to open one cover when the other is closed and means to prevent the outward passage of air through the open chamber.

2. A transfer tube system comprising a stationary terminal having a plurality of carrier receiving chambers, covers therefor and means whereby carriers may be placed alternately in said carrier receiving chambers, and a single transmission tube connected to said chambers and adapted to receive carriers therefrom.

3. A transfer tube system comprising a stationary terminal head having a plurality of carrier receiving passages, an air supply, a cover for each passage, a single transmission tube connected to said head and means whereby carriers may be placed alternately in the carrier receiving chambers.

4. A stationary terminal head for transfer tube systems having a plurality of carrier receiving chambers connected to a single discharge tube and means whereby carriers may be placed alternately in the carrier receiving chambers.

5. A transfer tube system comprising a carrier receiving chamber, a discharge chamber connected thereto, a delivery tube, a transmission tube formed with a movable section and means for connecting the free end of said movable section, to the discharge chamber or to the delivery tube.

6. A transfer tube system comprising a receiving chamber, a delivery tube, a transmission tube formed with a movable section and means for detachably connecting said movable section to the receiving chamber or to the delivery tube.

7. A transfer tube system comprising a terminal head having a plurality of carrier receiving chambers, an air supply connected to said chambers, a valve to control said supply, a cover for each of said chambers, means whereby the valve will be opened when one of the covers is closed, means whereby when one cover is closed the other cover will be opened, and means to prevent air passing out through the chamber that is open.

8. A transfer tube system comprising a terminal head having a plurality of carrier receiving chambers, an air supply connected to said chambers, a valve to control said supply, a cover for each of said chambers, means whereby the valve will be open when one of the covers is closed, electrical means whereby when one cover is closed the other cover will be opened, and means to prevent air passing out through the chamber that is open.

9. A transfer tube system comprising a terminal head having a plurality of carrier receiving chambers, an air supply connected to said chambers, a valve to control the air supply to each chamber, a cover for each of said chambers, electrical means for holding said covers closed, means whereby the valves will be open when the covers are closed, electrical means whereby when one cover is closed the other cover will be opened, and means to prevent air from passing out through the chamber that is open.

10. A transfer tube system comprising a terminal having a plurality of carrier receiving chambers, a single transmission tube connected to said chambers, an air supply connected to said chambers, a cover for each of said chambers, means for starting a motor when either of said covers is closed, a blower operated by said motor and connected to the terminal head, and timing devices in connection with said motor starting means.

11. A transfer tube system comprising a plurality of receiving chambers, closures therefor, a motor, a pump or blower operated thereby, means to deliver air from said pump to the receiving chambers, timing devices for the motor, and means whereby when one receiving chamber is closed the motor will be started and one timing device set in operation.

12. A transfer tube system comprising a plurality of receiving chambers, closures therefor, a motor, a pump or blower operated thereby, means to deliver air from said pump to the receiving chambers, timing devices for the motor, and means whereby when one receiving chamber is closed the motor will be started and one timing device set in operation, and means whereby should one receiving chamber be closed while the other receiving chamber is closed, the timing device in operation will be released and a second timing device will be set in operation.

13. A transfer tube system comprising a head containing a plurality of carrier receiving chambers, a single transmission tube adapted to receive carriers from said chambers, a closure for each of said chambers, electric means for holding said closures to close the chambers, means actuated by one closure device to release or open the electric holding means of the other closure, a motor controlling circuit, means operated by each closure device to complete said motor controlling circuit, a motor timing device for each closure, said timing device being in the motor controlling circuit, and means whereby when one timing device is thrown into operation the other timing device will be rendered inoperative.

14. A transfer tube system comprising a transmission tube, a plurality of receiving chambers connected to one end of said tube, closures therefor, a motor, a pump or blower operated thereby, means to deliver air from said pump to the receiving chambers, and means controlled by each of the closure devices for independently starting the motor and permitting it to operate a predetermined time.

15. A transfer tube system comprising a transmission tube, a plurality of receiving chambers connected to one end of said tube, closures therefor, a motor, a pump or blower operated thereby, means to deliver air from said pump to the receiving chambers, a motor controlling circuit adapted to be completed by the closure devices, and means independently controlled by each closure device and operated by the motor for opening said motor controlling circuit after a predetermined time.

16. A terminal head for transfer tube systems provided with a plurality of carrier receiving chambers, closures therefor, a single discharge member therefor adapted to be connected to a single transmission tube, an independent air inlet valve for each carrier receiving chamber, and means operated by the closure for said chamber to open said valve.

17. A terminal head for transfer tube systems provided with a plurality of carrier receiving chambers, closures therefor, a single discharge member therefor adapted to be connected to a single transmission tube, an independent air inlet valve for each carrier receiving chamber, and means operated by the closure for said chamber to open said valve, and means whereby when one chamber is closed the other will be open, and means to prevent air passing out through the open chamber.

18. A transfer tube system comprising a transmission tube, two receiving chambers means connecting said chambers to one end of said transmission tube, closures for said chambers, a motor starting apparatus independently controlled by each closure, a pump or blower operated by said motor, and means for connecting said pump to the receiving chambers, and means for stopping the motor.

19. A terminal head for transfer tube systems provided with a carrier receiving chamber, having perforated side walls for the admission of air, a slidable perforated sleeve-like valve surrounding said chamber, means for normally holding the valve with its perforations out of register with the perforations in the walls of the receiving chamber, a closure for the receiving chamber, and means operated by said closure to move the valve and thereby bring its perforations into register with the perforations in the receiving chamber.

20. A terminal head provided with two carrier receiving chambers, an inclosing casing therefor, the walls of the receiving chambers being perforated, a slidable sleeve-like valve for each receiving chamber, said valves being perforated, means for normally holding the valves with their perforations out of register with the openings in the walls of the receiving chambers, a closure for each receiving chamber, means operated by each closure to move the corresponding valve into open position, means whereby when one receiving chamber is closed the other will be open, and a valve at the inner ends of the chambers and adapted to close the inner end of the open chamber to prevent the escape of air when the opposite chamber is closed, and means for supplying compressed air.

21. A transfer tube system comprising a transmission tube, a pump to control the movement of air therethrough, a motor operating said pump, a motor circuit to control said motor, means for closing said motor circuit, and means operated by the motor for opening the motor circuit after a pre-determined time.

22. A transfer tube system comprising a transmission tube, a pump to control the movement of air therethrough, a motor operating said pump, a motor circuit to control said motor, means for closing said motor circuit, and means operated by the motor for opening the motor circuit after a pre-determined number of revolutions.

23. A transfer tube system comprising a transmission tube, a motor, means whereby the motor will control the movement of air through the tube, means for starting said motor, and means operated by the motor to render said motor inoperative at a pre-determined time.

24. A transfer tube system comprising a transmission tube, a terminal therefor, a closure for said terminal, a motor, means whereby said motor will control the movement of air through the transmission tube, means operated by the closure device to start the motor, and means operated by the motor to render said motor inoperative after a pre-determined time.

25. A transfer tube system comprising a transmission tube, a terminal therefor, a closure for said terminal, a motor, means operated by the motor to control the movement of air through said tube, a motor circuit, electrical means operated by the closure to complete the motor circuit and to hold the closure in position to close the terminal, and means operated by the motor to break the motor circuit and release the closure device at a pre-determined time.

26. A transfer tube system comprising a transmission tube, a terminal, a closure therefor, means operated by the closure to control the movement of air through the transmission tube, electrical means to hold the terminal closed, and means operated by the air controlling means to release the closure device at a pre-determined time and to stop the movement of air through the transmission tube.

27. A transfer tube system comprising a transmission tube, a closure device therefor, a motor adapted to be started by the closure device of the transmission tube, an air pump for supplying air to the transmission tube, means connecting said air pump to said motor, and a timing means operated by said motor to release said closure device at a pre-determined time.

28. A transfer tube system comprising a transmission tube, a terminal therefor, a device for closing said terminal, electrical means for holding said device in its closed position, an electric motor for moving air through the transmission tube, means whereby the closing of the terminal will render said motor operative, and means operated by the motor to render it inoperative at a pre-determined time.

29. A transfer tube system comprising a transmission tube, a cover therefor, means to hold said cover in its closed position, an electric motor to be set in motion by the closing of said cover, and means operated by said motor to release the cover holding means at a pre-determined time.

30. A transfer tube system comprising a plurality of stationary receiving chambers, means connecting said chambers to one end of a single transmission tube, a motor, a pump operated by said motor, means for connecting said pump to the transmission tube to control the movement of air therethrough, means for starting the motor, and means for stopping the motor at a pre-determined time.

31. A terminal head for a transfer tube system provided with a plurality of carrier receiving chambers, a single transmission tube connected to said chambers and adapted to receive the carriers therefrom, an independent air-valve for each receiving chamber, and means independently operating said valves.

32. An apparatus for controlling the movement of a fluid through a tube comprising a tube, a gate therefor, a fluid-moving means, means operated by the closing of the gate to set the fluid-moving means in operation, and means positively operated by the fluid-moving means for permitting the fluid-moving means to operate for a predetermined time.

33. An apparatus for controlling the movement of a fluid through a tube comprising a tube, a gate therefor, a fluid-moving means, means whereby on the closing of said gate fluid will be caused to move through said tube, and positively actuated means independent of the moving fluid and controlled by said gate for permitting the fluid-moving means to operate for a predetermined time.

34. A transfer tube system comprising a transmission tube, a terminal head connected thereto and provided with a plurality of carrier receiving chambers adapted to deliver carriers into said tube at one point, an air valve for each receiving chamber, a closure for each receiving chamber, means whereby the closure will open the air valve when the chamber is closed, a motor for moving air through said tube, means independently operated by each closure for starting the motor and permitting it to operate for a predetermined time, and means whereby after the motor is operated a predetermined time the closure which started the motor will be opened and the corresponding valve closed.

35. A transfer tube system comprising a terminal having a plurality of carrier receiving chambers, a single transmission tube connected to said chambers and adapted to receive carriers therefrom, covers for the carrier receiving chambers, means to open one cover when the other is closed means to prevent the outward passage of air through the open chamber, an air supply connected to said terminal, and means to shut off said air supply a predetermined time after the closure of either one of said covers.

36. A transfer tube system comprising a stationary terminal having a plurality of carrier receiving chambers, covers therefor, a single transmission tube connected to said chambers and adapted to receive carriers therefrom, an air supply connected to said terminal, and means to shut off said air supply a predetermined time after the closure of either of said covers.

37. A transfer tube system comprising a stationary terminal head having a plurality of carrier receiving passages, a cover for each passage, a single transmission tube connected to said head, an air pump, a blower connected to said pump, an air supply pipe connected to said terminal, means whereby the motor will be started when either of said covers is closed, and means whereby the motor will be stopped a predetermined time after the closure of said cover.

38. A transfer tube system comprising a terminal head adapted to receive carriers, an air pump connected to said terminal, a motor connected to said pump, a closure means for said terminal, means controlled by said closure means to operate the motor, and means adapted to stop said motor after a predetermined time.

39. A transfer tube system comprising a terminal head formed with a plurality of carrier-receiving passages, a closure means for each of said passages, and a single transmission tube adapted to receive carriers from all of the receiving passages.

40. A transmision tube comprising a terminal head formed with a plurality of carrier-receiving passages or chambers, an independent closure means for each of said chambers, and means for admitting air to any one of said chambers independently of all the other chambers.

41. A transfer tube system comprising a terminal formed with a plurality of carrier-receiving chambers, an independent closure device for each of said chambers, a motor, a blower connected to said motor, means at the terminal for starting said motor to supply air to the terminal, and means whereby said motor will be stopped within a predetermined time.

42. A transfer tube system comprising a transmission tube, a terminal therefor, an electric motor for moving air through the tube, means for completing the motor circuit and thereby starting the motor to move air through the tube, a controller rod, means operated by the motor to move said rod longitudinally, and means adapted to be engaged by the rod after a predetermined distance to open the motor circuit and thereby stop the motor.

43. A transfer tube system comprising a transmission tube, a pump to control the movement of air therethrough, a motor operating said pump, a motor circuit, means for closing said motor circuit, and a controller bar adapted to be moved by the motor for opening the motor circuit after a predetermined time.

In testimony whereof we hereunto affix our signatures in the presence of two witnesses this 10th day of May, 1905.

JOHN F. SKIRROW.
JOHN T. NEEDHAM.

Witnesses:
WM. R. DAVIS,
E. I. CAUGHLAN.